No. 630,198. Patented Aug. 1, 1899.
A. DOYLE.
DRIVING GEAR FOR BICYCLES.
(Application filed Aug. 3, 1898.)
(No Model.) 3 Sheets—Sheet 1.
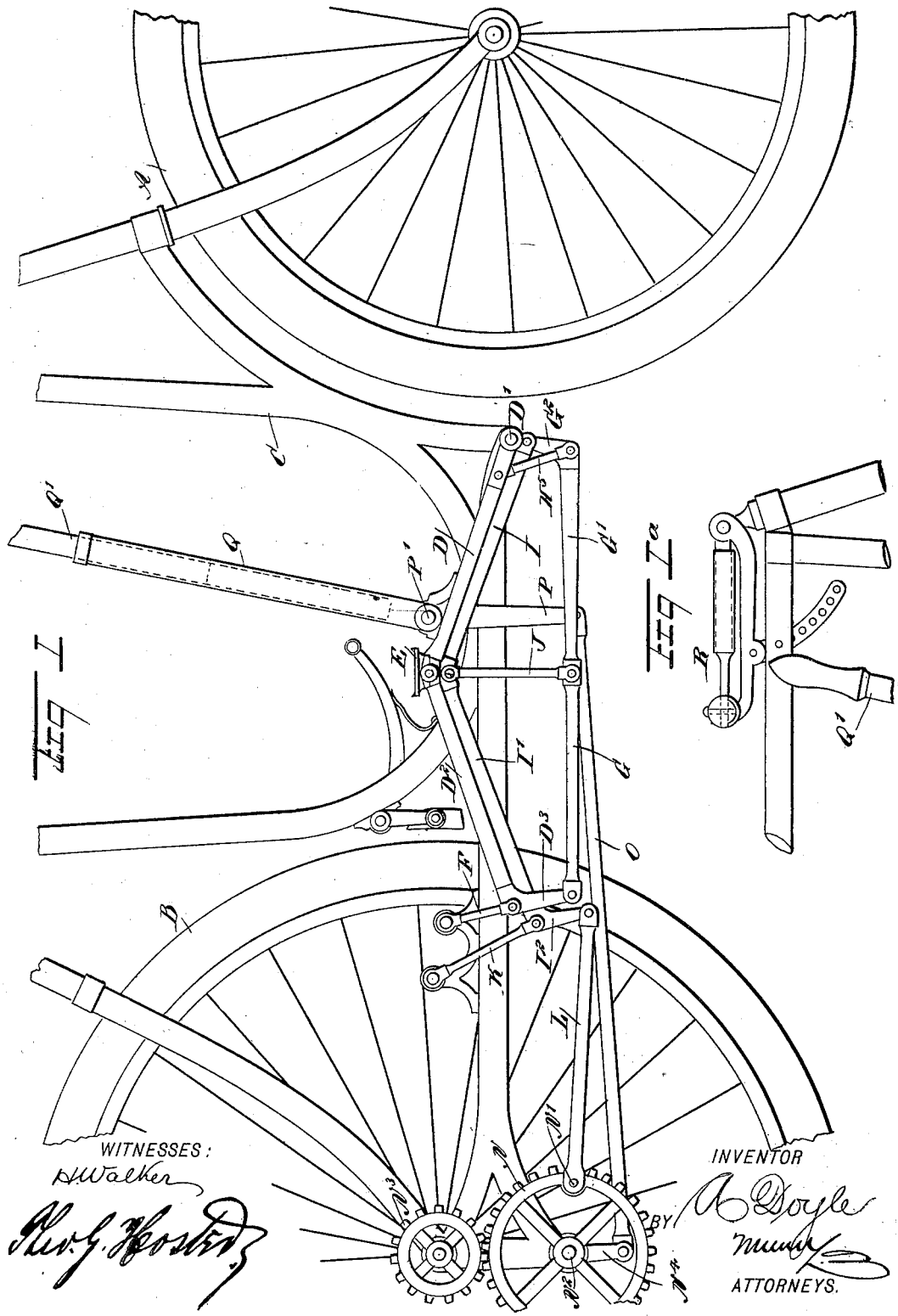

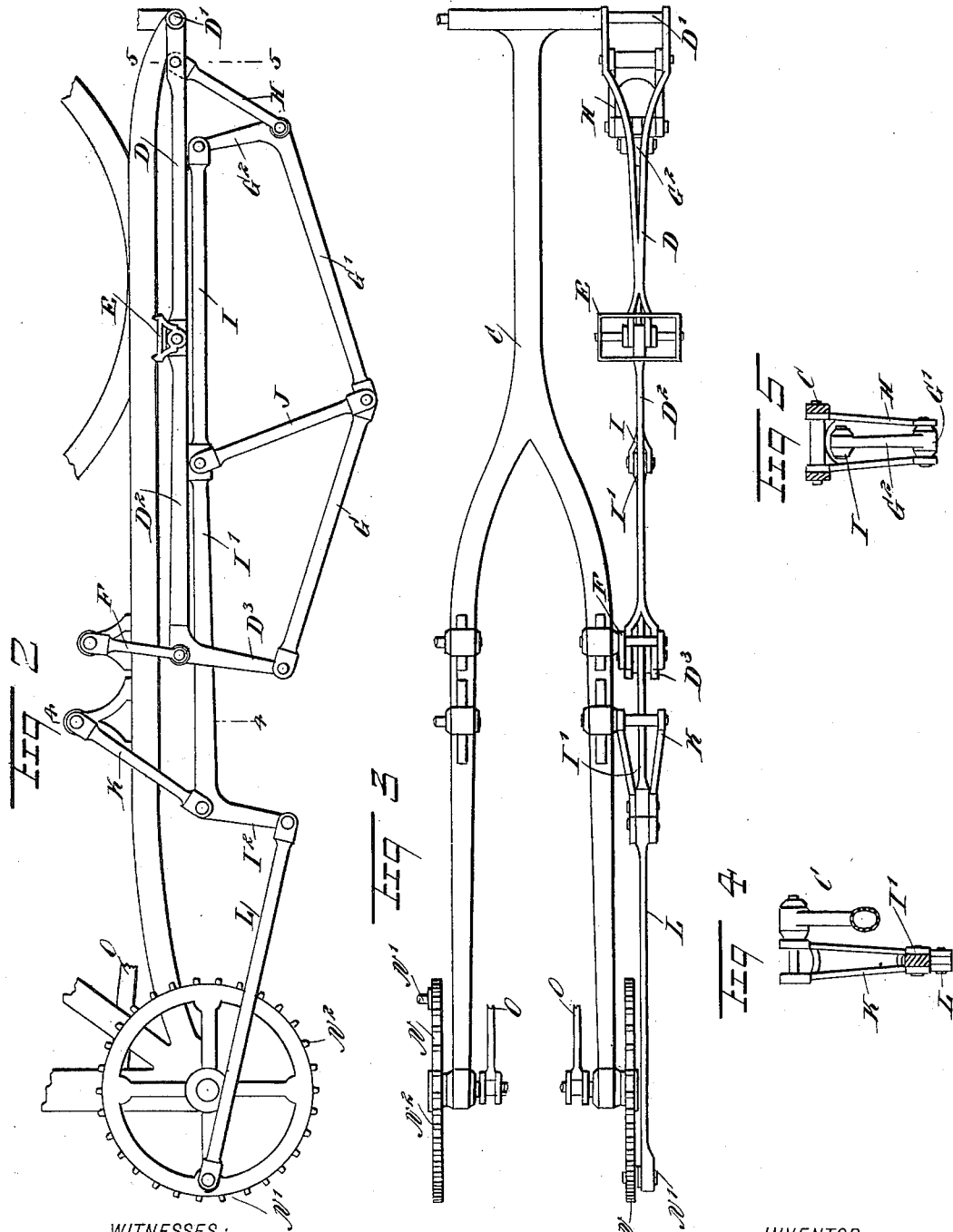

No. 630,198. Patented Aug. 1, 1899.
A. DOYLE.
DRIVING GEAR FOR BICYCLES.
(Application filed Aug. 3, 1898.)
(No Model.) 3 Sheets—Sheet 3.
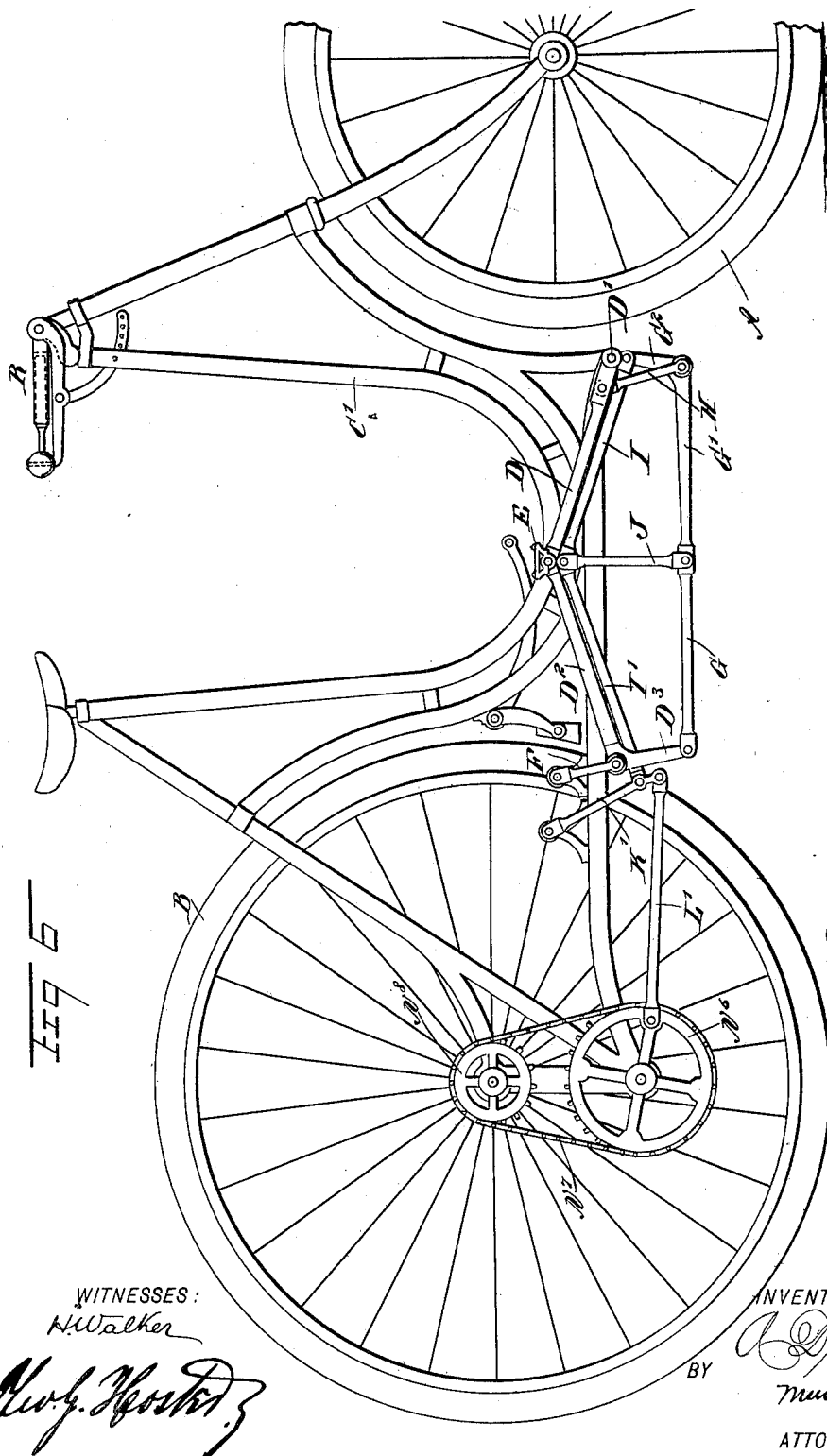
WITNESSES:
INVENTOR
BY
ATTORNEYS.

UNITED STATES PATENT OFFICE.

ARTHUR DOYLE, OF SEATTLE, WASHINGTON.

DRIVING-GEAR FOR BICYCLES.

SPECIFICATION forming part of Letters Patent No. 630,198, dated August 1, 1899.

Application filed August 3, 1898. Serial No. 687,613. (No model.)

*To all whom it may concern:*

Be it known that I, ARTHUR DOYLE, of Seattle, in the county of King and State of Washington, have invented a new and Improved Driving-Gear for Bicycles and other Machines, of which the following is a full, clear, and exact description.

The object of the invention is to provide a new and improved driving-gear for bicycles and other machines which is simple and durable in construction and arranged to require but a short up-and-down movement on the part of the rider's feet to develop a large amount of power and to run the machine at a high rate of speed and at the same time enable the rider or operator to augment at will the driving force by hand-power.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a side elevation of the improvement as applied to a bicycle for men. Fig. 1$^a$ is a like view of the hand-lever and the steering device. Fig. 2 is an enlarged side view of the foot-gear with parts in a different position. Fig. 3 is a plan view of the same. Fig. 4 is a transverse section of the same on the line 4 4 in Fig. 2. Fig. 5 is a similar view of the same on the line 5 5 in Fig. 2, and Fig. 6 is a side elevation of the improvement as applied to a bicycle for women.

The bicycle shown in Figs. 1 to 5, inclusive, is provided with the usual front wheel A, the rear or drive wheel B, and the frame C, on each side of which is fulcrumed at D' a toggle member D of a primary toggle, said member D being pivotally connected with a member D$^2$. On the pivot between the two members is arranged a pedal E, adapted to be engaged by the foot of the rider. The outer end of the toggle member D$^2$ is hung on a link F, fulcrumed on the frame C, and on said end of the member D$^2$ is formed an angular arm D$^3$, pivotally connected with a link G, having a pivotal connection with a link G', fulcrumed on a link H, hung on the member D of the primary toggle. The pivotal end of the link G' is formed with an angular arm G$^2$, connected with the member I of a secondary toggle operating in conjunction with the primary toggle previously mentioned, said member I having pivotal connection with the member I', and between the pivotal connections of the members I I' and the links G G' is arranged a link J, so that the secondary toggle opens and closes, as hereinafter more fully described.

The member I' of the secondary toggle has its free end hung on a link K, fulcrumed on the frame C, and said free end of the member I' is formed with an angular arm I$^2$, pivotally connected by a pitman L with a wrist-pin N' of a gear-wheel N, secured on a shaft N$^2$, journaled in suitable bearings in the frame C. The gear-wheel N is in mesh with a pinion N$^3$, secured to the hub of the rear or drive wheel B, so that the rotary motion given to the gear-wheel N is transmitted by the pinion N$^3$ to the rear or drive wheel B.

The wrist-pins N' of the two gear-wheels N on the opposite sides of the frame stand diametrically opposite each other, so that the pedal E on one side of the frame is in an uppermost position, while the pedal on the other side is in a lowermost position, or vice versa— that is, when one pedal moves upward the other moves downward.

When the several parts are in the position illustrated in Fig. 1 and the operator presses with his feet on the pedal E, then the primary toggle, consisting of the members D and D$^2$, opens up and the members D and D$^2$ move in alinement with each other at the time the pedal E is in its lowermost position, as indicated in Fig. 2. During this opening up of the toggle members D and D$^2$ the member D$^2$ by swinging rearward on the link F and turning thereon causes the arm D$^3$ to impart a closing movement to the links G G', which had been in alinement with each other, so that the said links now move into an angular position relatively to each other, and in doing so the link G' by its arm G$^2$ imparts a forward movement to the member I of the secondary toggle and a similar movement to the member I', so that the latter swings forward on the link K, and by the arm I$^2$ causes the pitman L to impart a rotary motion to the gear-wheel N. The secondary toggle, consisting of the members I I', moves into an open position with the primary toggle owing to the connection of the links G G' with the said members I I' by the link J, and consequently the primary toggle by means of the said links not only transmits the motion given to the pedal E, but increases the stroke of the secondary toggle and consequently that of the pitman L. By this arrangement I am enabled to increase the length of the stroke and crank-arm three or four fold and at the same time reduce the pitch or angle formed by the toggles in the same or in a greater ratio, both of which give the maximum of power with a minimum of pedal action or foot lift.

It is understood that the power and efficiency of a toggle depends entirely on the pitch or angle which it forms to the horizontal—that is, the toggle is very powerful when the angle is small and increases as the toggle descends and becomes as it approaches the horizontal almost infinite. On the other hand the power decreases rapidly as the angle is increased until an angle of about forty-five degrees is reached, after which the power exerted downwardly or vertically is greater than the longitudinal or horizontal power transmission.

By the construction shown the length of the stroke is relatively larger, while the angle formed by the toggle is comparatively smaller, thus giving the maximum of power by a minimum of foot lift.

The motion lost in the descending of the primary toggle D when approaching the horizontal is taken up and restored by the links G G' acting on the secondary toggle, consisting of the members I and I', it being understood that the links G G' also descend on the downward movement of the pedal E and recede from the horizontal, thus equalizing the motion of the pitman L throughout its entire stroke. A similar adjustment takes place so far as the power transmission is concerned, so that a uniform force is applied for driving the bicycle forward.

The secondary or supplementary toggles are for the special and specific purpose of increasing the length of stroke and crank-arm and for reducing the pitch or angle formed by the toggles, both of which features are essential to the production of the greatest amount of power and speed and also for the additional purpose of equalizing the motion of the pitman and for reducing the pedal action or foot lift. Both the primary and secondary toggles, also the links, always flex in the same direction and at the same time up or down, as the case may be.

The shaft $N^2$ is preferably provided with a crank-arm $N^4$, pivotally connected by a link O with an arm P, secured on a shaft P', journaled on the frame C. On this shaft P' is fastened a tube Q, in which is adjustably held a hand-lever Q' under the control of the operator, so that when the latter moves the hand-lever forward or backward then a rocking motion is given to the shaft P', so that the arm P, the pitman O, and the crank-arm $N^4$ assist in imparting a rotary motion to the shaft $N^2$ to assist in driving the bicycle forward. The bicycle is also provided with a suitable swinging device R, preferably of the construction shown and described in the application for Letters Patent, Serial No. 646,185, filed by me on July 28, 1897, and allowed on May 24, 1898.

The woman's bicycle shown in Fig. 6 is similar in construction to the one above referred to with the exception that the frame C' is changed in form and the member I' of the secondary toggle I is without the arm $I^2$ and is directly connected to the link K', having its free end connected with the pitman L' for a crank-wheel $N^6$ in the form of a sprocket-wheel, connected by a sprocket-chain $N^7$ with a sprocket-wheel $N^8$ on the hub of the rear or drive wheel B. The operation and action is precisely the same as the one above described, it being understood that the slight change in the connection between the motor I' and the pitman L' by way of the link K' does not change the motion of the various parts. The hand-power is omitted in the figure referred to.

The link J may be attached at its upper end to the primary toggle instead of the secondary toggle, as shown.

Having thus fully described my invention, I claim as new and desire to secure by Letters Patent—

1. A driving-gear, comprising a primary toggle one end of which has a fixed fulcrum and the other end is mounted on a swinging support, a pedal for the primary toggle, a secondary or auxiliary toggle having one end connected with the driving mechanism, the said end being mounted on a swinging support, and a connection between the other end of the secondary toggle and the end of the primary toggle having the swinging support, substantially as described.

2. A driving-gear comprising a primary toggle having one end pivot-fixed, a secondary or auxiliary toggle connected at one end with the driving mechanism, and links for connecting the free end of the primary toggle with said secondary toggle at a point remote from the connection with the driving mechanism, substantially as shown and described.

3. A driving-gear comprising a primary toggle having two members pivotally connected with each other, and of which the outer end of one member has a fixed pivot, a secondary toggle having two members pivotally connected with each other, the free end of one member being connected with the driving mechanism, and links intermediate the free end of the primary toggle and the secondary toggle, substantially as shown and described.

4. A driving-gear comprising a primary toggle having two members pivotally connected with each other, and of which the outer end of one member has a fixed pivot, a secondary toggle having two members pivotally connected with each other, the free end of one member being connected with the driving mechanism, links intermediate the free end of the primary toggle and the secondary toggle, and supporting-links for the free ends of the primary and secondary toggles, said supporting-links having fixed fulcrums, substantially as shown and described.

5. A driving-gear comprising a primary toggle having two members pivotally connected with each other, the outer end of one member being fulcrumed on a fixed pivot, the other end of the other member being formed with an angular arm, a link for supporting the outer end of the member having the angular arm, a pair of connected links having pivotal connection with said angular arm, one of the links having an angular arm, and a secondary toggle having two members pivotally connected with each other, one member being pivotally connected with the angular arm of the said link and the other member being connected with the driving mechanism, substantially as shown and described.

6. A driving-gear comprising a primary toggle having two members pivotally connected with each other, the outer end of one member being fulcrumed on a fixed pivot, the other end of the other member being formed with an angular arm, a link for supporting the outer end of the member having the angular arm, a pair of connected links having pivotal connection with said angular arm, one of the links having an angular arm, a secondary toggle having two members one member being pivotally connected with the angular arm of the said link, and the other member being connected with the driving mechanism, and a connecting-link between the pivoted connection and the members of the secondary toggle and the pivotal connection of said pair of links, substantially as shown and described.

7. A driving-gear for bicycles and the like, comprising a primary toggle having two pivotally-connected members, the outer end of one member having a fixed fulcrum, and the outer end of the other member being formed with a downwardly-extending angular arm, a link fulcrumed at one end on the frame of the machine and pivotally connected with the end of the primary toggle having the angular arm, a pair of links pivotally connected with each other, the outer end of one member of the pair being connected with the downwardly-extending angular arm of the primary toggle, and the outer end of the other member of the pair having an upwardly-extending angular arm, a secondary toggle having two members pivotally connected with each other, the outer end of one member being pivotally connected with the upwardly-extending angular arm of the said link, the outer end of the other member of the secondary toggle being connected by a link with the frame of the machine, the said end being also connected with the driving mechanism, a link connecting the outer end of the link having the angular arm, with the member of the primary toggle having the fixed fulcrum, at a point near said fulcrum, and a link extending from the junction of said connected pair of links to one of the toggles, substantially as set forth.

8. In a bicycle or the like machine, the combination with the frame of the machine, of the primary toggles located on opposite sides of the machine, and each having a fixed fulcrum at one end, pedals connected with the primary toggles, the secondary or auxiliary toggles also located on opposite sides of the machine, pitmen connected with the secondary toggles at one end thereof, crank-wheels journaled on each side of the machine, and driven from the said pitmen, the said crank-wheels having a driving connection with the drive-wheel of the machine, and links connecting the free ends of the primary toggles with the respective secondary toggles, substantially as shown and described.

ARTHUR DOYLE.

Witnesses:
W. PARRY SMITH,
C. R. MCKENZIE.